Figure 1:
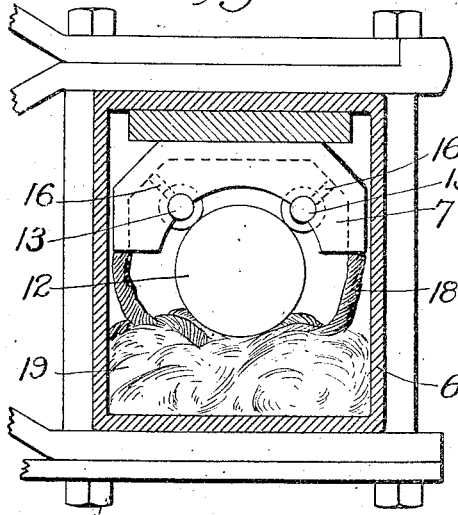

No. 884,866. PATENTED APR. 14, 1908.
A. H. SASSAMAN.
JOURNAL BEARING.
APPLICATION FILED DEC. 12, 1906.

WITNESSES
James F. Duhamel.
Aimee Brown.

INVENTOR,
Ambrose H. Sassaman
BY
Victor J. Evans
ATTORNEY.

UNITED STATES PATENT OFFICE.

AMBROSE H. SASSAMAN, OF NEW YORK, N. Y., ASSIGNOR OF ONE-FOURTH TO ADOLPH O. MEYER, ONE-FOURTH TO GEORGE W. KOERNER, AND ONE-FOURTH TO WILLIAM F. KOERNER, ALL OF NEW YORK, N. Y.

JOURNAL-BEARING.

No. 884,866.

Specification of Letters Patent.

Patented April 14, 1908.

Application filed December 12, 1906. Serial No. 347,532.

*To all whom it may concern:*

Be it known that I, AMBROSE H. SASSAMAN, a citizen of the United States, residing at New York, in the county of New York and State of New York, have invented new and useful Improvements in Journal-Bearings, of which the following is a specification.

My invention relates to journal bearings and has for its object a simple and effectual means for lubricating the bearing and at the same time providing for a minimum amount of friction by furnishing the journal with roller bearings having lubricating means so arranged as to further reduce the wear and friction, as will be further explained in the following specification, set forth in the appended claims and illustrated in the accompanying drawings, where it will be seen that like reference characters are used to designate the same part in the various figures.

Figure 2:
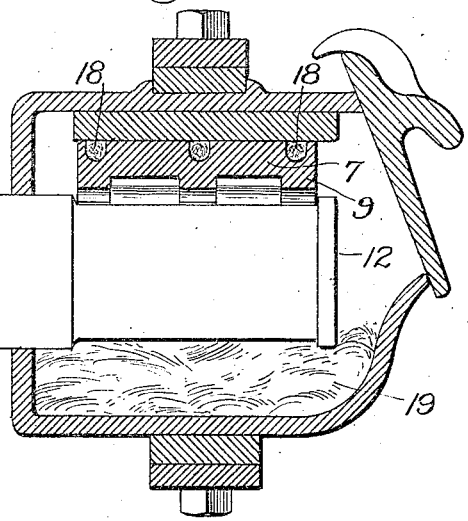
Figure 3:
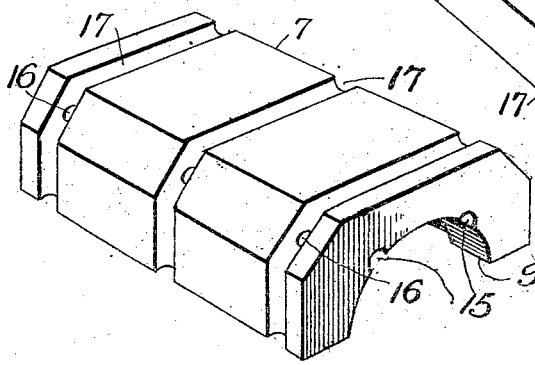
Figure 4:
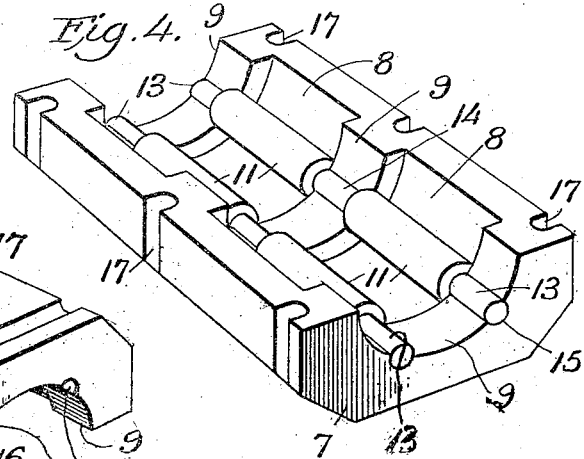

Figure 1 is a sectional view of the journal box looking towards the front of the journal. Fig. 2 is a cross-section of the journal box on line with the journal. Fig. 3 is a perspective view of the bearing piece, looking at its top. Fig. 4 is a view of the same bearing piece from its under side.

This invention is adapted to reduce the friction of the journal on its bearing to a minimum and at the same time provide this reduced bearing surface with sufficient lubrication to cause the journal to run with a minimum amount of friction and wear, and in order to provide for this feature I provide an ordinary journal box 6 such as ordinarily used on railroad cars with a bearing piece 7 of the form shown in the various figures. This bearing piece 7 is practically a block of hard metal having its under surface concentric with the journal and recessed as at 8, the ribs 9 forming sides or ends for these recesses and having sockets 15 forming bearings for the reduced ends of rollers 11. The larger portions of the rollers 11 lie in the recesses 8 and bear upon one side of the journal 12. The only contact which the rollers have with the bearing piece is at their journals formed by the reduced ends 13 and the reduced section 14 at their centers. Entering these sockets 15 in the bearing pieces are small orifices 16 which communicate with grooves 17 around the outer surface of the bearing block and which are adapted to carry wicks 18 which pass down into the lower part of the journal box and carry the oil therefrom to the upper surface of the block from whence it runs down the orifices and lubricates the reduced portions 13 of the rollers 11.

While it will be seen that I have shown the journal block provided with two rollers I do not limit myself to any particular number. Likewise there may be more of the ribs 9 than the number I have illustrated and the number of grooves 17 may be likewise varied to correspond with the ribs in order to provide the necessary lubrication for the reduced portions of the rollers 11. The journal box is as usual provided with the cotton waste 19 which applies the oil or grease to the axle journal itself and thus lubricates the bearing sections 13, 14 of the rollers where they come in contact with such journal.

What I claim as new and desire to secure by Letters Patent is:

In combination with a journal-box and an axle-journal extending thereinto, a bearing piece disposed opposite one side of the axle-journal and having an inner concaved face provided with alternating ribs and recesses, the ribs dividing said recesses and being formed with open bearing sockets, the outer face of said bearing piece having shallow transverse grooves at points opposite the respective ribs and communicating vertical grooves extending down upon the sides and through the edges of the bearing face of the bearing piece, and channels leading at an angle from the points of intersection of said transverse and vertical grooves to the said open bearing sockets, lubricant conducting wicks disposed in such grooves and extending into the journal-box, and antifriction rollers interposed between the bearing piece and axle-journal, and having reduced journals mounted in the open bearing sockets of the bearing piece, said journals being retained in said sockets against displacement in the axle-journal by the pressure of the latter, whereby the rollers are free for removal from the bearing sockets when the bearing piece is removed from the journal-box.

In testimony whereof, I affix my signature in presence of two witnesses.

AMBROSE H. SASSAMAN.

Witnesses:
JAMES F. DUHAMEL,
H. G. HOSE.